C. E. WILSON.
DYNAMO ELECTRIC MACHINE.
APPLICATION FILED MAY 4, 1916.

1,358,809.

Patented Nov. 16, 1920.

WITNESSES
R. J. Ridge.
J. R. Langley

INVENTOR
Charles E. Wilson.
BY
Wesley G. Carr
ATTORNEY

UNITED STATES PATENT OFFICE.

CHARLES E. WILSON, OF WILKINSBURG, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,358,809.

Specification of Letters Patent. Patented Nov. 16, 1920.

Application filed May 4, 1916. Serial No. 95,315.

*To all whom it may concern:*

Be it known that I, CHARLES E. WILSON, a citizen of the United States, and a resident of Wilkinsburg, in the county of Allegheny and State of Pennsylvania, have invented a new and useful Improvement in Dynamo-Electric Machines, of which the following is a specification.

My invention relates to dynamo-electric machines, and it has for its object to provide a machine that is simple in construction and economical in manufacture.

In the manufacture of dynamo-electric machines, it has been the usual practice to construct the field-magnet frames either by casting them or by welding bars of steel or wrought iron into suitable ring-shaped members. These processes are comparatively expensive because of the large amount of time and labor involved.

According to the present invention, I utilize iron or steel pipe of cylindrical shape that is cut into sections of suitable lengths for field-magnet frames of dynamo-electric machines by means of automatic machines. The pipe is machined upon its exterior and interior surfaces, cut into proper lengths and arranged to receive end brackets upon its end portions without removing it from the machine.

Pole pieces for the field-magnet frame are formed by rolling a bar of iron or steel in a cold state into such shape that its cross section is suitable for pole pieces. The rod is then cut into desired lengths and the pole pieces are attached to the cylindrical frames.

Figure 1:
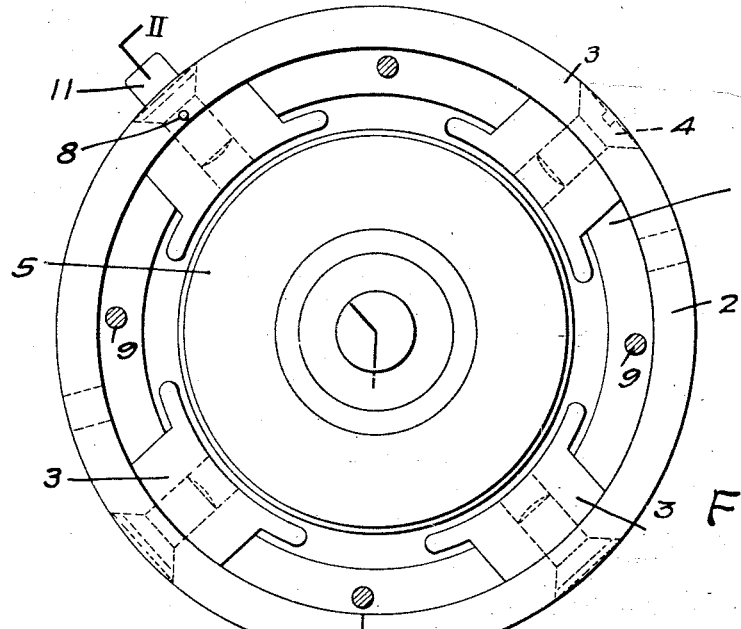
Figure 2:
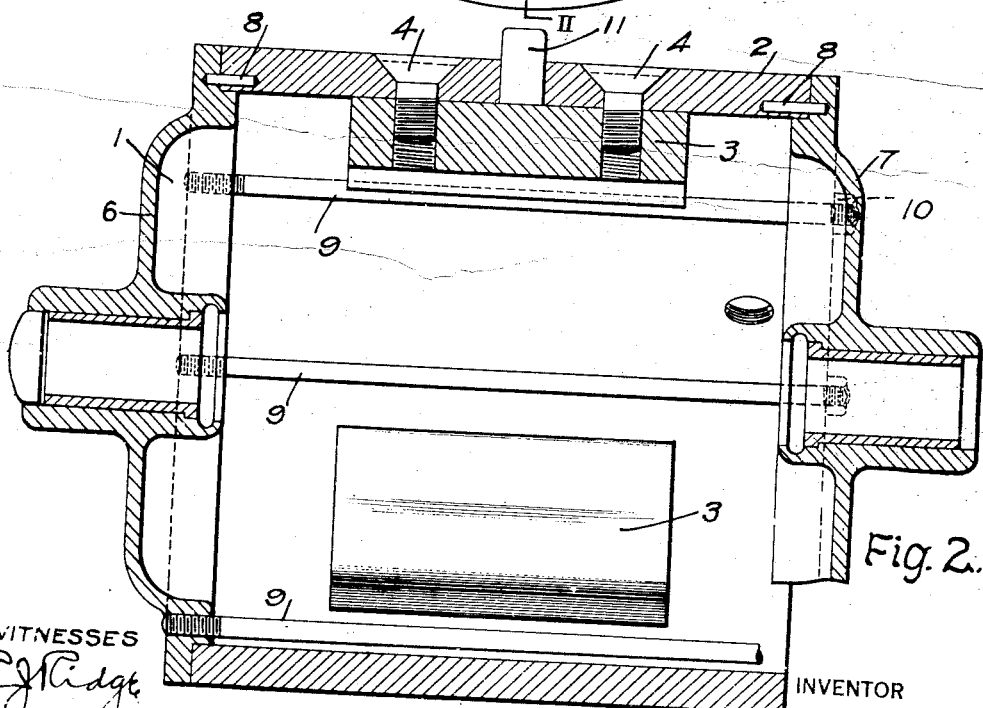

The details of my invention will be described in connection with the accompanying drawings in which Figure 1 is an end view, partially in elevation and partially in section, of a dynamo-electric machine constructed in accordance with my invention. Fig. 2 is a view, in longitudinal section, taken on line II—II of Fig. 1, of the mechanism of Fig. 1, the armature being removed for the sake of clearness.

A dynamo-electric machine 1 comprises a cylindrical field-magnet yoke 2 to which are secured pole pieces 3. The pole pieces 3, which are, for example, four in number, are secured to the field-magnet frame 2 by means of suitable bolts or screws 4. The armature 5 is rotatably supported by end brackets 6 and 7 that are prevented from rotating relatively to the field-magnet frame by means of dowel pins 8. The end brackets 6 and 7 are held in place by studs 9 which have a screw-threaded engagement, at one end, with the end bracket 6 and are provided, at the other end with suitable nuts 10.

In the construction of dynamo-electric machines similar to that shown and described, iron or steel pipe of the desired diameter and of a suitable thickness is employed in constructing the field-magnet frames. This pipe may be such as is manufactured by the usual processes for making it seamless or substantially so. The pipe is fed to a machine of the type known as the full automatic turret machine which operates automatically to machine the interior and exterior surfaces of the pipe to remove irregularities of surface or dimension and to cut the pipe into sections of the length desired. The ends of the sections are properly machined in order that end plates or brackets may be secured thereto. All of the above operations are performed without removing the material from the machine. The pipe sections are then provided with radially extending holes through which screws or bolts may be inserted to secure the pole pieces in position. This operation is preferably performed by a gang drill which drills all of the holes simultaneously.

The pole pieces are constructed by first rolling a rod of steel or iron in a cold state into such shape that the cross section of the rod is suitable for the desired purpose. The rod is then cut into sections of suitable length and each section is provided with holes corresponding to those in the field magnet yokes. The field magnet coils (not shown) are placed upon the pole pieces and the latter are firmly secured to the field magnet yoke by means of the screws 4.

The armature 5 is next placed in position and the end brackets 6 and 7 are placed in position at the respective ends of the field-magnet frame. The studs 9 are then inserted through holes in the end brackets 7 to engage the end bracket 6, and the brackets 6 and 7 are firmly clamped together by means of the nuts 10. The dowel pins 8, which have a tight or driving fit within the holes provided for them in the ends of the field-magnet frame, register with corresponding holes in the end brackets 6 and 7 to prevent relative movement between these parts. A pin 11, which projects radially outwardly from the side of the dynamo-electric machine, is provided in order that the dynamo-electric machine may be firmly and securely held in a fixed position to prevent its rotation relatively to any suitable support, such as, for example, a bracket or cradle upon the chassis or engine of an automobile.

By means of the above described method of constructing dynamo-electric machines, I am enabled to manufacture them at a cost materially lower than that obtaining in the manufacture of dynamo-electric machines in accordance with the usual practices. A large amount of labor is avoided by the use of machines which automatically perform the greater part of the operations necessary to construct the field-magnet frames.

I claim as my invention:

1. The method of manufacturing field-magnet frames for dynamo-electric machines which consists in machining the interior and exterior surfaces of a cylindrical pipe, cutting the pipe into sections of lengths suitable for field-magnet yokes, preparing the ends of said sections to receive end plates and securing pole pieces to said field-magnet yokes.

2. A dynamo-electric machine comprising a field-magnet frame consisting of a section of pipe of magnetizable material and pole pieces secured to said field-magnet frame.

3. A dynamo-electric machine comprising a field-magnet frame consisting of a section of cylindrical pipe of magnetizable material and pole pieces secured to said field-magnet frame.

4. The method of manufacturing field-magnet frames for dynamo-electric machines which consists in dividing pipe into sections and securing pole pieces to the pipe sections.

In testimony whereof I have hereunto subscribed my name this 24th day of April, 1916.

CHARLES E. WILSON.